I. N. SHANE.
FLOWER BOX.
APPLICATION FILED SEPT. 9, 1914.
1,142,634.
Patented June 8, 1915.
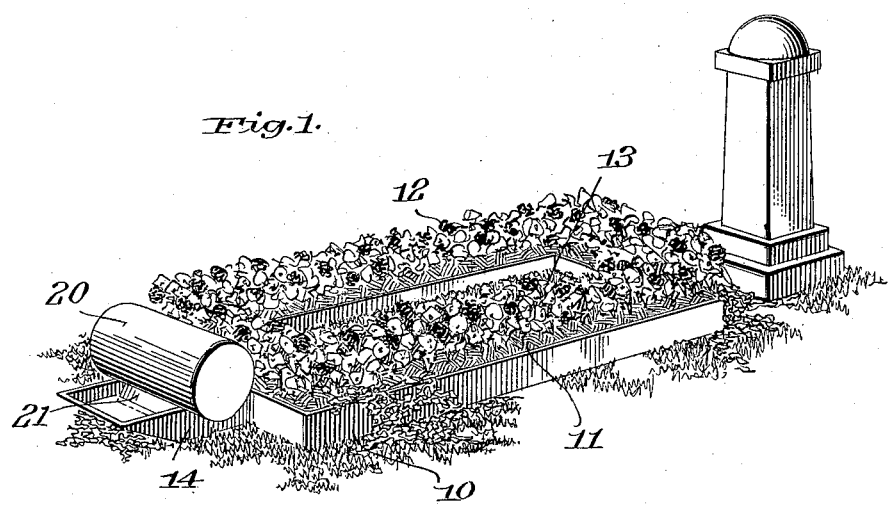
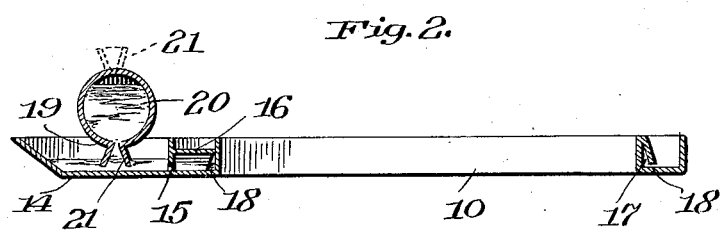
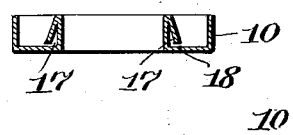
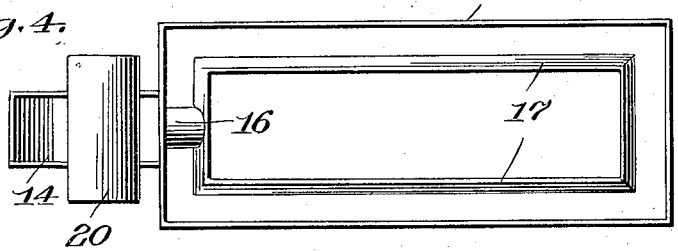
Inventor
I. N. Shane,
By Victor J. Evans
Attorney
Witnesses

UNITED STATES PATENT OFFICE.

ISAAC N. SHANE, OF WINFIELD, KANSAS.

FLOWER-BOX.

1,142,634.

Specification of Letters Patent.

Patented June 8, 1915.

Application filed September 9, 1914. Serial No. 860,891.

*To all whom it may concern:*

Be it known that I, ISAAC N. SHANE, a citizen of the United States, residing at Winfield, in the county of Cowley and State of Kansas, have invented new and useful Improvements in Flower-Boxes, of which the following is a specification.

An object of the invention is to provide a flower box particularly adapted for use on graves in cemeteries and whereby flowers can be suitably arranged around the grave and constantly watered to prevent the flowers from withering or drying up, and keeping the flowers in a growing and blooming state.

The invention contemplates, among other features, the provision of a flower box of a simple construction and which includes the provision of a suitable reservoir for supplying water to the trough of the box, thus constantly watering the flowers, with the supply of water through the part of the box containing the flowers adapted to be increased or decreased correspondingly to the amount of water needed by the flowers for their proper growth and development.

In the further disclosure of the invention reference is to be had to the acccompanying drawings, constituting a part of this specification, in which similar characters of reference denote corresponding parts in all the views, and in which:

Figure 1 is a perspective view showing my device in use; Fig. 2 is a vertical longitudinal sectional view, with the reservoir shown in full lines in one position and dotted lines in another position; Fig. 3 is a vertical transverse sectional view taken through the flower box; and Fig. 4 is a plan view of the flower box, the flowers having been removed therefrom.

Referring more particularly to the views, I disclose a substantially rectangular trough 10 adapted to contain a quantity of earth 11 in which are planted suitable flowers 12, said trough being arranged to encircle a grave 13. At one end of the trough 10 there projects a basin 14 which, through the medium of an opening 15 and a conduit 16, communicates with a supply conduit 17 formed within the trough 10, with the inner wall of the trough constituting a wall of the conduit, said conduit having a series of openings 18 therein communicating with the channel-like portion of the trough. The basin 14 is provided with a plurality of grooved portions forming a seat 19 for a reservoir 20 having a preferably flared outlet 21. The reservoir 20 is adapted to be slightly rotated on the seat for the purpose of increasing or decreasing the flow of water to the trough through the medium of the conduit 17, and referring to the views it will be seen that when the reservoir has been filled with water and placed upon the seat, the water flowing from the reservoir will pass through the conduit 16 into the conduit 17 and thence passing through the openings 18 will moisten the earth 11 in the trough 10, thus supplying moisture to the flowers contained in the earth. Now when the outlet 21 of the reservoir depends immediately beneath the reservoir and lies in a vertical plane, the said outlet will be near the bottom of the basin and thus when the conduit and basin fill with water from the reservoir, the outlet from the reservoir will be closed by the water, thus forming an effective fluid seal and which, preventing the entrance of air into the reservoir, will shut off the exit of water therefrom. At the moment the water is used up to an extent which causes the same to have its level below the outlet of the reservoir, the air passing into the reservoir will immediately permit additional water from the reservoir to bubble therefrom into the basin and thence into the conduit. By adjusting the outlet of the reservoir relatively to the basin, it will be seen that the depth of water in the basin can be increased by having the outlet of the reservoir farther away from the bottom of the basin so that the adjustment of the reservoir on the basin will permit of increasing or decreasing the depth of water therein, as will be readily understood.

As mentioned heretofore, I preferably employ my device for use on graves, although the same may be also used on porches and in flower beds.

Having thus described my invention I claim:

1. In combination with a trough having a supply conduit therein, a basin on the trough and having grooves in the sides thereof, the conduit connecting said basin with the supply conduit, and a reservoir adjustably mounted in the grooves of the basin to control the supply of water therefrom to said basin.

2. In combination with a trough having a supply conduit, a basin on the trough and communicating with the supply conduit, said basin being provided with a plurality of grooves in the sides thereof, and a reservoir movably supported in the grooves, said reservoir being adjustable in the grooves to control the supply of water therefrom to the said basin.

3. In combination with a trough having a supply conduit, a basin communicating with the supply conduit, a reservoir on said basin, and a flared mouth for said reservoir and lying within said basin, said reservoir being movable on said basin to dispose the mouth in different positions within the basin whereby to control the supply of fluid from the reservoir to the basin.

In testimony whereof I affix my signature in presence of two witnesses.

ISAAC N. SHANE.

Witnesses:
JOHN HAYES,
W. A. KENDALL.

Copies of this patent may be obtained for five cents each, by addressing the "Commissioner of Patents, Washington, D. C."